United States Patent [19]
Kalinoski

[11] Patent Number: 4,773,275
[45] Date of Patent: Sep. 27, 1988

[54] SEAL FOR CERAMIC FLOW TUBE

[75] Inventor: Richard W. Kalinoski, East Providence, R.I.

[73] Assignee: The Foxboro Company, Foxboro, Mass.

[21] Appl. No.: 866,653

[22] Filed: May 27, 1986

[51] Int. Cl.[4] ................................. G01F 1/84
[52] U.S. Cl. .................. 73/861.12; 204/286; 204/400
[58] Field of Search ........... 73/861.12–861.17; 204/196, 197, 286, 297 R, 400

[56] References Cited
U.S. PATENT DOCUMENTS

| 4,181,013 | 1/1980 | Wada | 73/861.12 |
| 4,297,896 | 11/1981 | May | 73/861.12 |
| 4,297,897 | 11/1981 | Young | 73/861.12 |
| 4,565,619 | 1/1986 | Gardner et al. | 73/861.12 |

Primary Examiner—Herbert Goldstein
Attorney, Agent, or Firm—Terrence Martin

[57] ABSTRACT

A seal for ceramic flow tubes resistent to high temperature, pressure and corrosion factors is made by fusing a first polymer to the ceramic as a binding layer, fusing to the first layer a second flexible polymer layer chemically and temperature resistent to the process fluid, and holding the two layers under a resilient loading. The seal is highly leak tight, chemically durable, inexpensive to produce and repairable without sacrificing valuable components.

20 Claims, 1 Drawing Sheet

U.S. Patent  Sep. 27, 1988  4,773,275

SEAL FOR CERAMIC FLOW TUBE

TECHNICAL FIELD

The invention relates to seals and in particular to electrode seals in magnetic flowmeter tubes. More particularly the invention relates to electrode seals in ceramic magnetic flowmeter tubes.

BACKGROUND ART

Magnetic flowmeters having a general tubular shape are placed as a section in a pipeline allowing fluid to pass through them. Two metal electrodes are placed diametricaly opposite each other in the tube wall, to contact an electrically conductive fluid. An external magnetic circuit is used to generate a magnetic field across the diameter of the pipe and at right angles to the axis of the electrodes. A voltage is then induced by the conductive fluid flowing across the magnetic field according to Faraday's law. The induced voltage is detected by the electrodes and is proportional to the fluid flow rate.

To prevent the measurement voltage from leaking off, insulating material is placed around the field measurement zone. If the tube is metal, it is lined with an insulating material such as polytetrafluoroethylene. Alternatively, the tube may be made wholly from a non-magnetic electric insulator, such as a ceramic. Lined tubes have limited erosion resistance, relatively poor mechanical stability, and problems with loosening and shifting of the liner. In either case the electrodes pass through holes in the tube wall and liner, if any, to contact the fluid. A light-tight seal must be made between the electrode and the tube wall.

Ceramics are now being used as flow tubes. High purity aluminum oxide ceramic is an excellent flow tube material because of its excellent corrosion and erosion resistance. Alumina is a high electrical insulator and has good mechanical stability and strength. These material features allow industrial magnetic flowmeters to be used with a wide variety of liquids including very strong acids and bases; and at both high temperatures and pressures. As a result, and in particular due to the high material quality provided by ceramic flow tubes, high material standards have been placed on the electrode and seal portion of the meter. Platinum is recognized as the best electrode material for the chemical, electrical, and mechanical demands. It functions well but is, however, expensive. The remaining problem is then to seal the electrode to the ceramic given the harsh operating conditions.

Platinum electrodes are currently fused in ceramic flow tubes. A platinum wire is placed through the wall of the ceramic tube while the ceramic is still in an unfired or "green" state. The tube and wire are then kiln fired at about 1750° C. The ceramic shrinks around the wire in what is hoped to be a leak-tight seal. Achieving a leak-tight seal is difficult because platinum has a slightly higher thermal expansion coefficient than ceramic and therefore shrinks away from the ceramic as the assembly cools from the kiln firing temperature. Pressure tests have proven fused joints to be unreliable for leak rates of $10^{-8}$ atm-cc/sec of helium or less. Differential contraction then makes the integrity of the fused seal questionable from the time of manufacture. Also, due to the thermal expansion mismatch and thermal cycling, incomplete fusing, scratches in the metal wire, and chemical attack of the fused joint, the fused joint is subject to failure in service.

Another problem with fusing the electrode to the ceramic is repair. Once the tube leaks the costly ceramic is lost, and the valuable platinum fused in the ceramic is recovered only with difficulty. Poor or erratic production yields along with the inability to repair the seal or salvage either the ceramic tube or the platinum electrode makes the fused-in electrode an expensive production process.

Traditional compressed washer type seals are felt to be unreliable. Since the ceramic surface on a microscopic level is rough, there are small packages between the ceramic and the washer that allow helium passage during testing. Over time it is felt, such passages would also leak corrosives leading to failure. Traditional O-ring seals made of soft, resilient materials such as silicone, fluorocarbon or nitrile rubbers might seal the micropassages, but such softer materials are felt to lack durability, and in particular to lack the chemical resistance required. One O-ring material that may work is a terpolymer, of perfluoro(methylvinyl ether) and tetrafluoroethylene and a perfluorinated cure site monomer. It has completely fluorinated bonds making it chemically suitable. Unfortunately the material is expensive, and may lose its sealing properties under cold conditions.

Fluoroplastics such as polytetrafluoroethylene (PTFE), fluorinated ethylene propylene (FEP), and perfluoroalkoxyethylene (PFA) have long been accepted in magnetic flowmeter applications as having the best chemical and temperature withstanding capability. They are used as liner materials for metal flow tubes. It has been found that a spring-loaded fluoroplastic gasket placed between the electrode head and the counterbore in the ceramic does not provide the leak tightness required. This is due both to the rough surface texture of the counterbore and the inability of the fairly rigid gasket to flow into the rough ceramic surface and seal off the small passages. Lapping of the counterbore inside the tube may smooth the surface for a tight seal, but takes time and is subject to error and is therefore not considered attractive from a production standpoint.

It is therefore an object of the invention to provide a seal to a ceramic material. An additional object is to provide a seal able to withstand pressure, heat and corrosion resistance to a broad range of chemicals from strong acids to strong bases. Still another objective is to provide a seal allowing repair and recovery of costly components.

SUMMARY OF THE INVENTION

Applicant has found that ceramic flow tubes may be sealed by fusing a first polymeric material on one side thereof to the ceramic flow tube, and on the other side thereof to a second flexible polymeric layer, which second flexible polymeric layer is adjacent an electrode head. The electrode head and seal assembly is then maintained under a live spring tension applied from outside the flow tube to effect a seal therebetween.

BEST MODE FOR CARRYING OUT THE INVENTION

Figure 1:
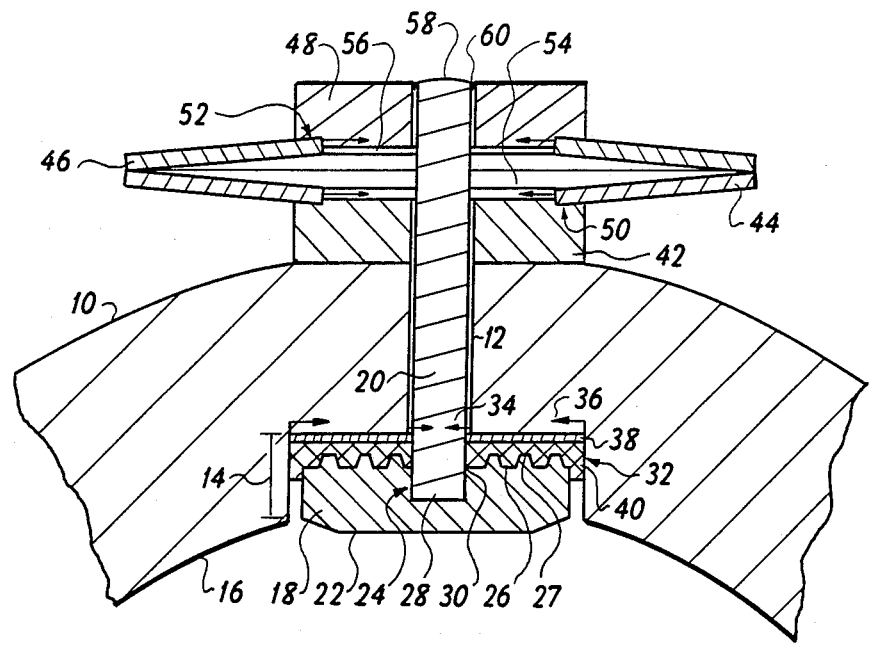
FIG. 1 is a cross section of an electrode penetrating a ceramic flow tube and sealed according to the preferred embodiment of the invention.

The electrode assembly broadly comprises an electrode head joined to an electrode stem passing through the tube wall passage and joined to a tensioner that applies a force to the electrode stem. The electrode head is drawn tightly to a two-layer polymeric gasket material which in turn is compressed against the tube. The entire assembly is heated so the first polymeric layer melts and fills the surface texture of the ceramic and upon cooling fuses to both the ceramic and thereafter the second polymeric layer.

In greater detail, a preferred embodiment of the electrode assembly may be manufactured for a ceramic flow tube as follows.

A ceramic tube 10 includes a passage 12 through the tube wall having a countersunk or recessed zone 14 along an inner surface 16 of the tube 10 providing space to contain an electrode head 18.

The electrode comprises the head 18, and a stem 20 section, which is preferably made of platinum. The electrode head is manufactured in the general form of an disk having a face side 22 to be directed to the flow tube interior, a central cylindrical cavity 24, and an underside 26. The underside 26 is notched, grooved, or serrated with teeth 27 to press into a gasket 32.

The electrode stem 20 is conveniently an elongated cylinder of platinum whose length is greater than the thickness of the flow tube wall. One end 28 of the stem 20 is positioned in the central cylindrical cavity 24 of the electrode head 18 to flushly contact the stem wall with the interior face of the central cavity 24 of the head price 18. The stem 20 is then brazed or welded to the head 18 along their mutual seam 30. Alternatively the head 18 and stem 20 may be machined as a single piece.

An annular gasket 32 is constructed having central passages 34 sufficiently large to accept the diameter of the electrode stem 20, and having exterior diameter 36 to fit the diameter of the countersunk or recessed zone 14 of the flow tube. The gasket 32 is formed in two layers. The first is a thin (for example, 0.25 mm) layer 38 of perfluoroalkoxyethylene (PFA), and is positioned adjacent the tube wall 16 in the countersunk or recessed zone 14. A gasket of PFA is not a very soft material and where only mechanical pressure is used to maintain the seal, a PFA gasket has only a marginal sealing ability with the rough ceramic surface 16. However, PFA does have good chemical resistance, and can be melted to a fluid state at about 310° Celsius.

Figure 2:
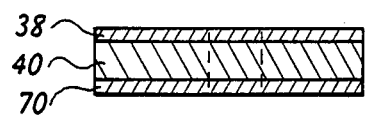
FIG. 2 is a cross section of an alternative form of a gasket structure.

Second layer 40 is thicker (for example, 0.63 mm) and is composed of polytetrafluoroethylene (PTFE). Thicker gasket layer 40 is positioned between thinner layer 38 and the electrode head 18. PTFE has equally good chemical resistance and has a higher melting temperature of about 329° C. PTFE does not melt to a liquid state, but rather turns to a viscous, nonflowing, gel-type substance. An alternative gasket form includes an additional thin layer 70 of PFA positioned on the opposite face of the gasket between the thicker layer 40 of PTFE and the electrode head 18. As shown in FIG. 2 the alternative gasket has, in order, the thin layer 38, thicker layer 40, and then a third layer 70 which may also be thin and perhaps of the same material as first thin layer 38.

The choice of gasket materials may be altered, and the use of the foregoing specific materials is not mandatory. Polymeric fluorocarbons, those having completely fluorinated bonds and not those having hydrogen bonds, are recommended for their chemical durability. The first material used must have the ability to be flowed into and close the surface crevices of the ceramic and thereby stop possible leakage along the crevices. The first material should be chemically resistant to the process fluid at the temperature of operation. The volume of the thin layer should be large enough to fill the roughness of the ceramic, and it should be fusible to the second layer. The thinner layer 38 material should bond to the flow tube and be capable of withstanding a force greater than any stress between the tube and the gasket due to thermal expansion over the range of tube operation temperatures. The thin layer 38 may creep slightly during use.

The thickness and thus the volume of the thicker layer 40 needs to accommodate the depth of any penetration from the teeth 27 to the electrode head 18. The thickness of the thicker layer 40 is to prevent the electrode teeth 27 from penetrating the gasket 32 and contacting the tube wall 16 which may cause misalignment of the electrode. The thicker layer 40 also must to provide some resilience and flexibility for thermal compression and expansion without unnecessary creeping. It is useful for the thicker layer to bond to the thinner layer 38, but it is not necessary provided their interface seals under pressure. Where the thinner layer 38 is allowed to bond, and fill the surface of the ceramic, it may similarly flow and fill the surface of the thicker layer 40 forming a congruent boundary.

PFA tends to flow out of the gasket area when it melts. PTFE, on the other hand, melts into a gel and tends to stay in place. Thus, the composite of PFA with its bonding properties and PTFE with its low flow characteristics in the molten state provides the desired dimensional control and seal quality.

The gasket 32 is positioned in the countersunk or recessed zone 14 with its central passage 34 aligned with the axis of the tube passage 12, and flush with the tube wall 16. Countersinking electrode head 18 reduces the amount of flow turbulence induced at the electrode site and protects both the head 18 and the gasket 32 from mechanical damage and abrasion. The electrode stem 20 is passed through the gasket passage 34, through the flow tube passage 12, to be exposed at the tube exterior where the stem 20 is joined to a tensioner assembly. The preferred embodiment of the tensioner assembly consists of two positioning washers 42, 48 and two Belleville washers 44, 46, all being generally annular in shape.

The two positioning washers 42, 48 each have central passages accommodating the exposed electrode's stem 20. Each positioning washer 42, 48 has a sharp edged circular lip 50, 52 facing radially outward formed along one side of the washer, and concentric with the washer's axis. The two Belleville washers 44, 46 each have interior diameters 54, 56 greater than that of the stem such that the interior diameter 54 of the first Belleville washer 44 mates with the lip edge 50 of the first positioning washer 42, and the second Belleville washer 46 similarly mates with the lip edge 52 of the second positioning washer 48.

The first positioning washer 42 is placed about the exposed electrode system 58 with its lip edge 50 facing away from the flow tube 10. The first Belleville washer 44 is mated to the first positioning washer 42 so as to be compressed towards the flow tube. The second Belleville washer 46 then is placed over the stem 20, contacting the first Belleville washer 44 so as to be compressed away from the flow tube. Lastly, the second positioning washer 48 is placed around the exposed stem 20 with its lip edge 52 facing the flow tube and mating with the second Belleville washer 46.

The second positioning washer 48 is forced along the electrode stem 20 in the direction towards the electrode head 18 while the electrode head 18 is held firmly against the gasket 32. The Belleville washers 44, 46 are thereby compressed between the positioning washers 42, 48, to a gasket stress of at least $4 \times 10^6$ Pa. In the compressed configuration the exposed electrode stem 58 is then welded to the exposed face of the second positioning washer 48 along their mutual seam 60. The means for compression are removed trapping the Belleville washers 44, 46 in compression between the force transmitting positioning washers 42, 48 thereby tensioning the electrode stem 20, forcing the underside 26 of the electrode head 18 to close against the gasket 32 and the interior of the flow tube 16. The electrode head 18 is then sealed with the gasket along a contact area so as to draw any serrations, or teeth 27 into the surface of the thicker layer 40. The live loading of the seal maintains the seal despite any future creep in the gasket due to aging or temperature change. The tensioning assembly takes up any creep, expansion or contraction in the whole assembly so the gasket 32 does not separate from either the tube or the electrode.

The entire assembly may then be heated to the melting point of the thin layer 38 of PFA. The thin layer 38 melts, and flows or is pressed by the tensioning assembly into the crevices of the ceramic, while the thicker higher melting point material 40, PTFE remains substantially solid. The melted thin layer 38 PFA for the most part remains trapped between the ceramic wall 16 and the thicker gasket 40 material PTFE.

Upon cooling, the thinner PFA layer 38 fuses to both the ceramic wall 16 and the thicker PTFE gasket layer. The thicker PTFE layer 40 combined with the live load provides a resilient seal which protects the integrity of the melted in seal.

Applicant's sealing method was tested in 31 flow tubes for a total of 62 seals, using gaskets with a single 0.635 mm layer of PTFE, and a single 0.127 mm layer of PFA. Prior to heating, the tubes were tested for helium leakage and all but one leaked at rates greater than $10^{-8}$ cc/sec. The tubes were oven heated at 310° C. for 2.5 hours to bring the mass of the tubes to temperature and thereby heat the PFA to melting. Upon cooling the tubes were retested and 59 seals showed no leakage at the limit of the detection equipment, $2 \times 10^{-10}$ atmcc/sec helium. The three seals that leaked were reheated, and subsequently showed no leakage, suggesting either a longer heating or higher temperature might be useful.

There have been shown and described what are at present considered to be the preferred embodiments of the invention. It will be apparent to those skilled in the art that various changes and modifications can be made herein without departing from the scope of the invention defined by the appended claims. For example, the sealing arrangement discussed is generally applicable to sensors or other items inserted through the wall of a flow tube. The mechanical means of providing a compressive load may be changed by substituting coil or similar springs for the Belleville washers. The compression of the springs may be accomplished by threading a nut on a shaft. The gasket may be placed on the exterior wall of the tube. The choice of the sealing materials may be varied including the use of one material with the attributes of the two described here.

I claim:

1. An electrode sealing arrangement in an electromagnetic flowmeter including a ceramic flow tube, comprising:
   a. an elongated electrode having a first end, a second end, and an elongated shaft connecting said ends, wherein said first end includes an electrode head having an at least partially exposed first surface for contacting a fluid and a second, sealing surface at least partially circumjacent said shaft first end said second end having a first force application point lying along the elongated shaft;
   b. said ceramic flow tube having exterior and interior walls, an electrode shaft passageway therebetween, and a seal area on the interior wall circumjacent said shaft passageway;
   c. polymeric gasket means having multiple layers including a first polymeric layer with a first outer seal surface, and a second layer with a second outer seal surface, said layers being intimately bonded; and
   d. spring force means for applying a substantially linear force between said first and second force application points;
   wherein the seal first surface is hot melt bonded to the flow tube seal area, the electrode shaft extends through the flow tube shaft passageway with the electrode head inside the flow tube and the second end extending beyond the flow tube exterior wall, wherein said second force application point is external to the flow tube, and the spring means compresses the seal between the electrode head and the tube interior wall seal area.

2. The sealing arrangement of claim 1 wherein the gasket material is substantially impervious to the process fluid in the operative temperature range.

3. The sealing arrangement of claim 1 wherein the gasket is bonded to the flow tube with a force greater than any stress between the tube and the gasket due to thermal expansion over the range of tube operation temperatures.

4. The sealing arrangement of claim 1 wherein the volume of the first material is at least as great as the volume of any surface variations of the flow tube over the seal area.

5. The sealing arrangement of claim 1 wherein the first material intimately fills surface variations in the flow tube seal area.

6. The sealing arrangement of claim 1 wherein the first material has a melting temperature higher than the highest temperature of expected operation.

7. The sealing arrangement of claim 1 wherein the first material is perfluoroalkoxyethylene.

8. The sealing arrangement of claim 1 wherein the second material is substantially impervious to the process fluid in the operative temperature range.

9. The sealing arrangement of claim 1 wherein the second material is polymeric.

10. The sealing arrangement of claim 1 wherein the second material is polytetrafluoroethylene.

11. The sealing arrangement of claim 1 wherein the flow tube and the electrode are subject to thermal expansion, and the spring force means provides a range of displacement greater than the greatest expansion due to thermal expansion of the flow tube and the electrode, and creep of the gasket.

12. An electrode sealing arrangement in an electromagnetic flowmeter, comprising an electrode with an elongated shaft, a ceramic flow tube having interior and exterior walls and an electrode shaft passageway therebetween, a multiple layer seal, and tensioning apparatus to compress the seal between the flow tube interior wall and the electrode wherein the seal includes a first surface of a first polymeric material bonded to a second material having a second face, said seal first surface being hot melt bonded to the flow tube interior around said electrode shaft passageway, said seal second surface is in intimate contact with the electrode, and said tensioning means retains the tube interior wall, the seal, and the electrode in sealing engagement.

13. The sealing arrangement of claim 12 wherein the gasket is bonded to the flow tube with a force greater than any stress between the tube and the gasket due to thermal expansion over the range of tube operation temperatures.

14. The sealing arrangement of claim 12 wherein the first material intimately fills surface variations in the flow tube seal area.

15. The sealing arrangement of claim 12 wherein the first material has a melting temperature higher than the highest temperature of expected operation.

16. The sealing arrangement of claim 12 wherein the first material is perfluoroalkoxyethylene.

17. The sealing arrangement of claim 12 wherein the second material is substantially impervious to the process fluid in the operative temperature range.

18. The sealing arrangement of claim 1 wherein the second material is polymeric.

19. The sealing arrangement of claim 12 wherein the second material is polytetrafluoroethylene.

20. The sealing arrangement of claim 12 wherein the tensioning apparatus provides a range of displacement greater than the greatest expansion due to thermal expansion of the flow tube and the electrode, and creep of the gasket

* * * * *